No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 1.

Fig. 1.

Witnesses:

Inventor:
William H. Taneyhill,
by Humphrey & Humphrey
attys.

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 2.

Fig. 2.

Witnesses: Inventor:
William H. Taneyhill,
by Humphrey & Humphrey,
attys.

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 3.

Fig. 3.

Witnesses:
Inventor:
William H. Taneyhill,
by Humphrey & Humphrey,
attys.

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 5.

Fig. 5.

Witnesses:
Inventor:
William H. Taneyhill,
by Humphrey & Humphrey.
Attys.

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 6.

Witnesses:

Inventor:
William H. Taneyhill,
by Humphrey & Humphrey,
attys

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 7.

Fig. 7.

Witnesses: Inventor:
William H. Taneyhill,
by Humphrey & Humphrey,
attys

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 8.

Fig. 8.

Witnesses: Inventor:
William H. Taneyhill,
by Humphrey & Humphrey,
attys.

No. 658,901. Patented Oct. 2, 1900.
W. H. TANEYHILL.
MACHINE FOR ROLLING TUBES FOR PNEUMATIC TIRES.
(Application filed Aug. 4, 1900.)
(No Model.) 9 Sheets—Sheet 9.

Witnesses:

Inventor:
William H. Taneyhill,
By Humphrey & Humphrey,
attys.

UNITED STATES PATENT OFFICE.

WILLIAM H. TANEYHILL, OF COLUMBUS, OHIO, ASSIGNOR OF ONE-HALF TO DAVID B. AUNGST, OF AKRON, OHIO.

MACHINE FOR ROLLING TUBES FOR PNEUMATIC TIRES.

SPECIFICATION forming part of Letters Patent No. 658,901, dated October 2, 1900.

Application filed August 4, 1900. Serial No. 25,929. (No model.)

*To all whom it may concern:*

Be it known that I, WILLIAM H. TANEYHILL, a citizen of the United States, residing at Columbus, in the county of Franklin and State of Ohio, have invented a certain new and useful Improvement in Machines for Rolling Tubes for Pneumatic Tires, of which the following is a specification.

My invention has relation to improvements in machines for rolling tubes to form pneumatic tires for vehicles that consist of an inner tube of rubber on which are successively rolled additional layers of rubber-saturated fabric and covered with an envelop of rubber, the whole to be provided with a valve-stem and to have their ends joined previous to vulcanization to form an endless tube susceptible of being inflated. Heretofore two methods have been generally adopted in the construction of these tubes, in one of which the mandrel bearing the inner tube is revolved on its axial line, and the successive layers are brought edgewise to it and by its motion rolled around it, being pressed in the operation by side rollers parallel and of equal length with the mandrel. In the other the mandrel bearing the inner tube is rolled by hand on the successive layers, the layers being pressed together to cohere by a grooved roller passed by hand from end to end of the mandrel during the process of rolling. In the first method holes are left in the successive layers of the tire for the valve-stem, which is inserted and cemented in place by hand near the union of the ends during the process of joining them and after the mandrel has been removed from within the tire. In the second method each ply of fabric is sufficient to go around the mandrel and lap and the opening for the valve-stem is formed by cutting notches in the edges of that lap, the valve-stem being inserted in this opening and cemented in place. Objection has been found to both methods because in the first small quantities of air or moisture remain between the layers, that expand in the process of vulcanization, thereby causing blisters, that prevent the layers of the tire cohering at all points, and as a result the security and durability of the tire are impaired. In the second the expense due to the employment of hand labor offers a serious obstacle to the manufacture of the articles for the market where competition in trade is strong, and in both the method of placing the valve-stem is tedious and expensive and in the first is insecure and imperfect, often resulting in a defect in the tire at that point.

One object of my invention is to overcome these objections by producing a machine which shall automatically roll these tubes with a progressive movement, shall during the process cause grooved pressure-rollers to reciprocally repeatedly travel along the tire on the mandrel from end to end, and shall raise to clear the tire at each partial revolution of the mandrel to prevent abrasion of the layers. A further object is to roll the flange of the valve-stem between the layers of the tire and to locate it between the ends instead of at or near the joint, and a final object is to make the apparatus self-discharging when the rolling is completed.

To the aforesaid objects my invention consists in the peculiar and novel construction, arrangement, and combination of parts hereinafter described, and then specifically pointed out in the claims, reference being had to the accompanying drawings, forming a part of this specification.

In the accompanying drawings, in which similar reference characters indicate like parts in the different figures,
Fig. 6, a similar elevation of the right half;
Fig. 11 of Sheet 6, an enlarged central section of one of the heads for holding the ends of the mandrel, and Fig. 12 an enlarged view of the catch for operating the discharge-lever.

Referring to the figures, 1 2 are two oppositely-disposed parallel rails supported, respectively, by legs 3 4 5 6, the inner opposite edges of which rails are grooved to form ways for a sliding carriage and constitute the housing for the machine. Fitted to slide in the grooves in this housing is a rectangular frame 7, with side and end pieces, but open in the center.

Figure 1:
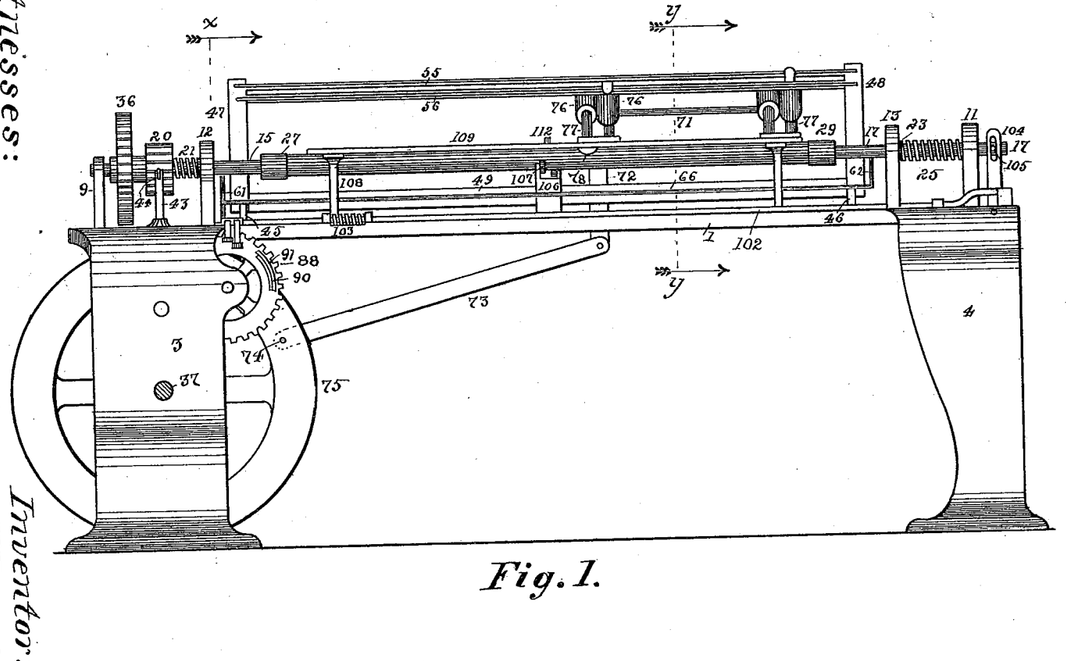
Figure 1 is a side elevation presenting a general view of my machine, with the main shaft in section at the front face of the supporting-leg.
Figure 2:
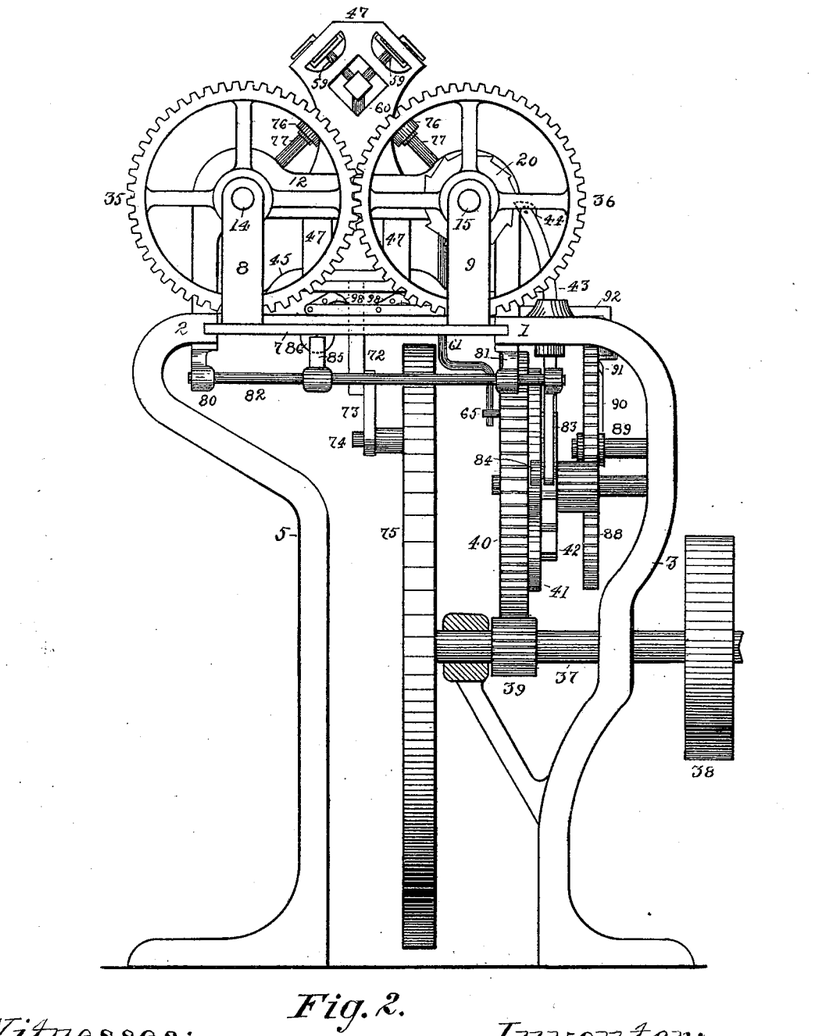
Fig. 2, an end elevation, enlarged, looking from the left of Fig. 1.
Figure 3:
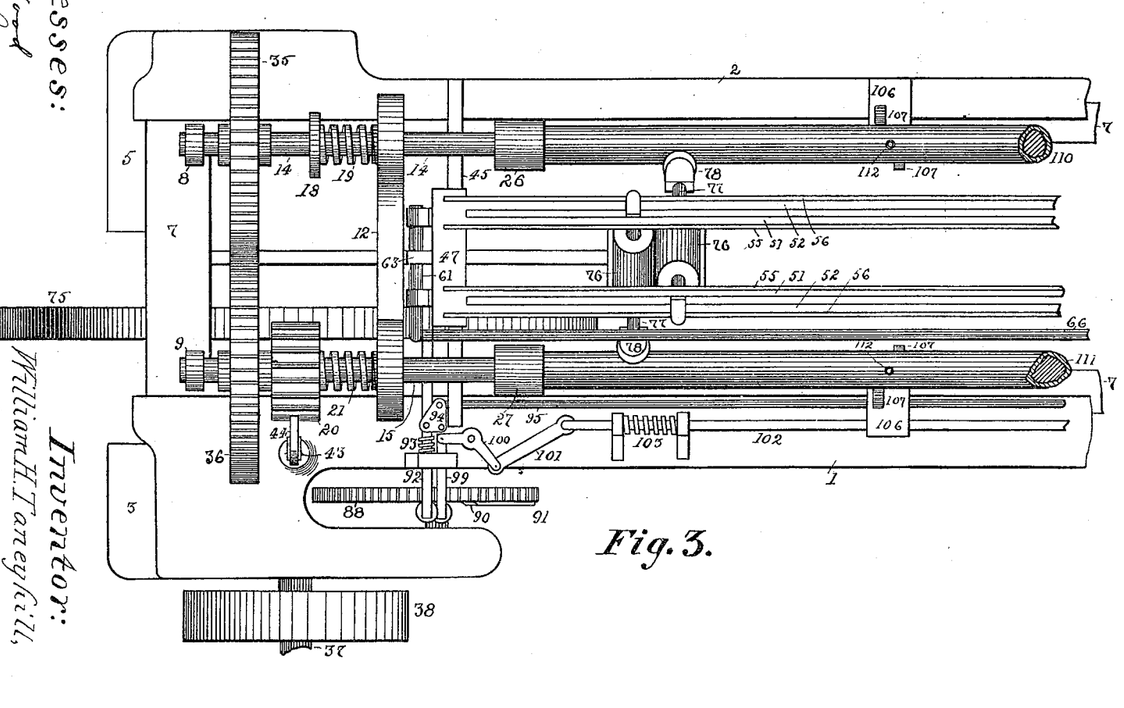
Fig. 3, a plan, enlarged, of the left half.
Figure 4:
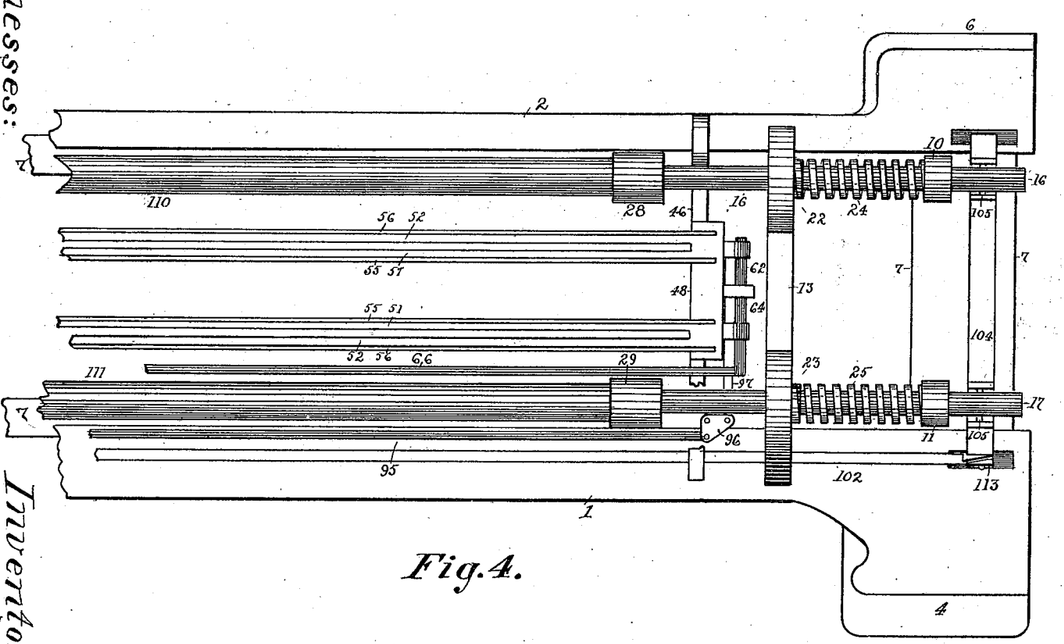
Fig. 4, a plan, enlarged, of the right half.
Figure 5:
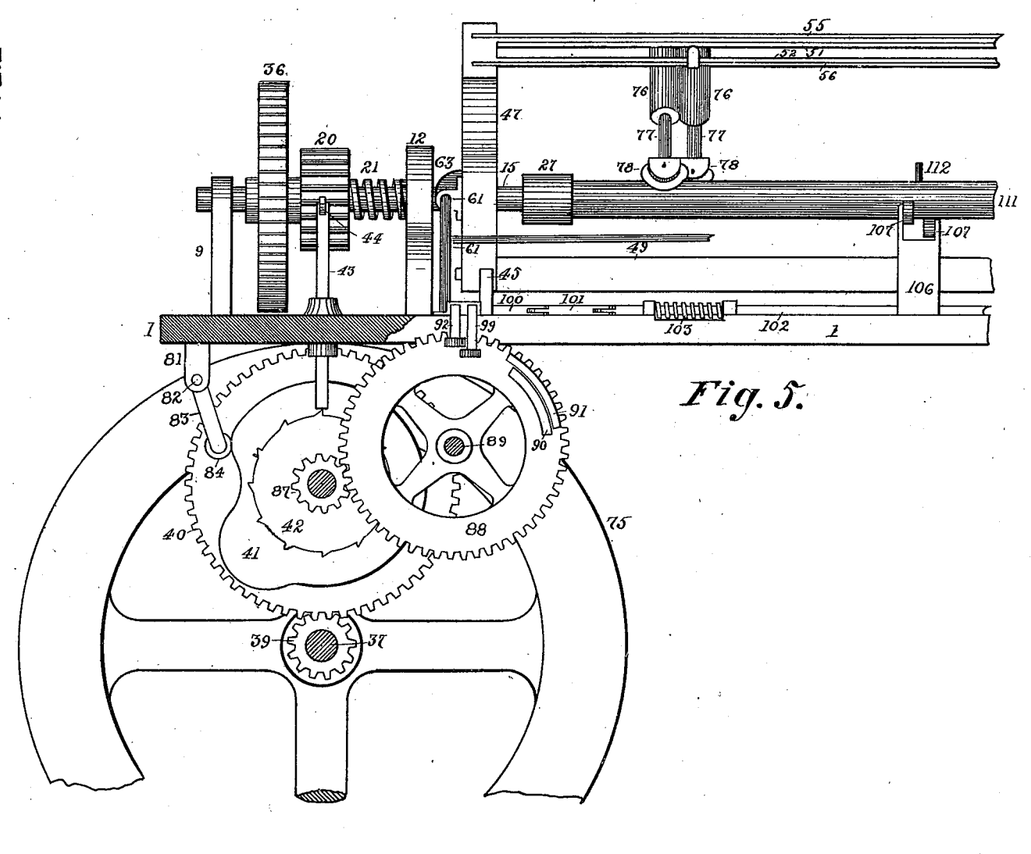
Fig. 5, a side elevation, enlarged, of the left half with a portion of the frame broken away to show the parts behind it.

To avoid confusion, the arrangement of parts as shown in Fig. 1 will be followed where they are designated as being at the right or left.

From the left end piece of the frame 7 arise two posts 8 9, and from the right end piece two similar posts 10 11, which posts are accurately bored parallel with the housing to form bearings for shafts, hereinafter described.

Near the left end of the housing and uniting the rails 1 and 2 is a bridge 12, and near the opposite end a similar bridge 13, consisting of upright posts and a connecting-beam integral therewith, which bridges are enlarged and circular at the corners and bored in alinement with the openings in the posts 8, 9, 10, and 11 to form in the same manner shaft-bearings, and in each pair of bearings thus constituted are severally journaled short shafts 14, 15, 16, and 17, respectively, the last two capable of longitudinal movement in the bearings. On the shaft 14 is secured a collar 18, between which and the bridge 12 is a coiled spring 19, that constantly tends to push the shaft and carriage 7 to the left. A ratchet-wheel 20 on the shaft 15 fulfils the same function with reference to a coiled spring 21, interposed between it and the bridge 12. On the shafts 16 and 17 there are like collars 22 23, respectively, between which and the posts 10 and 11 coiled springs 24 25 constantly tend to push these shafts to the left. On the ends of the shafts 14, 15, 16, and 17 that extend toward the center of the machine are placed heads 26, 27, 28, and 29, each similar in construction and shown in enlarged section in Fig. 11. The projecting end of each head has a conically-tapering opening 30 to receive and accurately center the end of the tire-mandrel, and back of this a recess 31 with a transverse slot uniting them. In the recess 31 is a cup-shaped piston 32, having a blade 33, that passes through the slot into the conical opening 30, and this piston is constantly pressed outward by a coiled spring 34, the object and purpose of which is to eject the end of the tire-mandrel when the rolling process is completed, as hereinafter described.

On the shafts 14 15 are respectively mounted like gears 35 and 36, that mesh with each other, and thus cause the shafts to move in unison. To produce intermittent revolution of the gears 35 and 36 and the tire-bearing mandrels, as well as to operate the tire-rollers hereinafter described, there is journaled in the leg 3 and a bracket secured thereon a shaft 37, bearing a driving-pulley 38 and a pinion 39, that meshes in a gear 40. Connected and running with this gear 40 is a cam-wheel 41 for a purpose to be stated, and a trip-wheel 42, arranged to repeatedly raise a pawl-bar 43, which bears at its upper end a pivoted pawl 44 to engage the ratchet-wheel 20 and cause a partial revolution of the shaft 15 and gear 36 at the moment that the pressure-rollers are raised from contact with the tire, as hereinafter stated.

Figure 7:
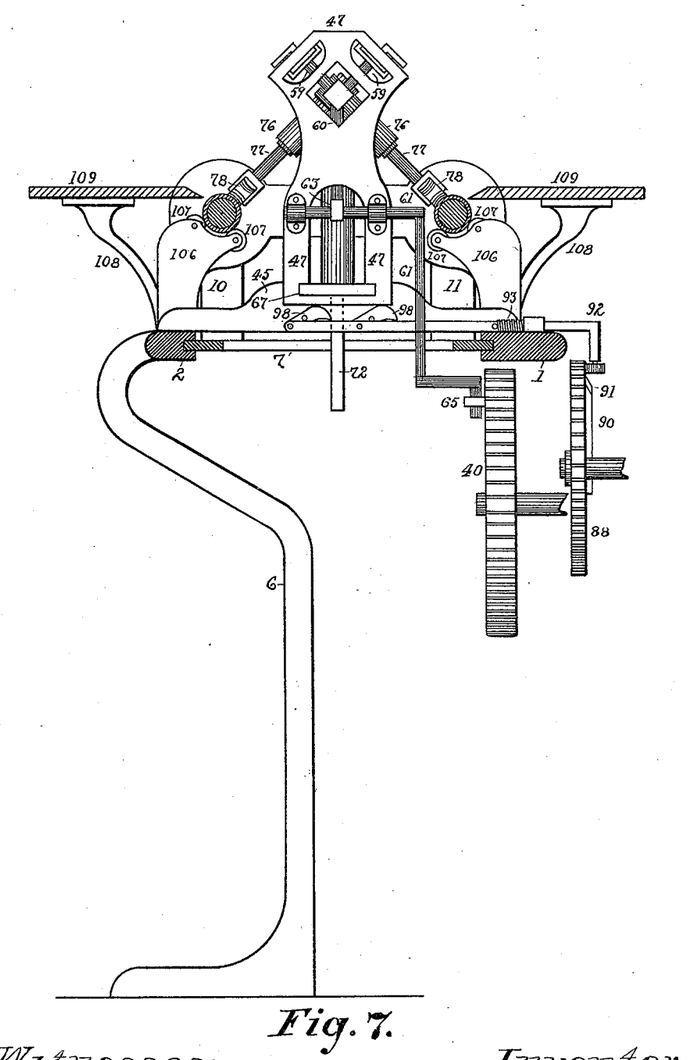
Fig. 7, a section, similarly enlarged, at the line *x x* of Fig. 1.
Figure 10:
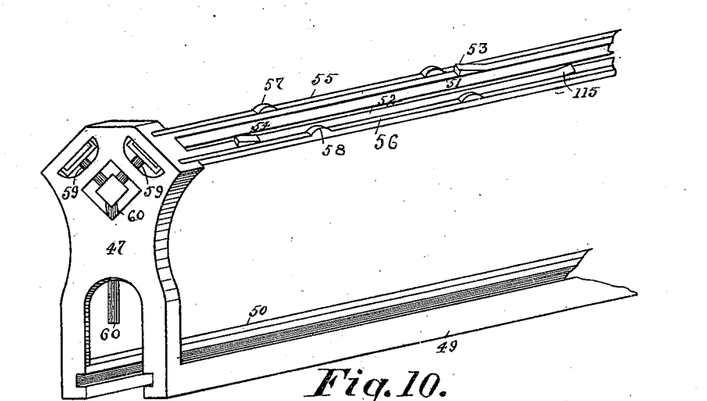
Fig. 10, a perspective of parts of the guides for the roller-carriage.

Across the housing near but toward the center from the bridges 12 13 are two fixed cross-bars 45 46, in the central parts of which are wide rectangular notches to form seats for the roller-frame. This roller-frame (partially shown in Fig. 10) consists of two bifurcated uprights 47 48, united at the bottom by parallel rails 49 50, similarly grooved in their adjacent faces to form ways for a sliding roller-bearing carriage. The roller-frame rests in the notches in the cross-bars 45 46 and is secured against longitudinal movement, but is free to move vertically therein for a short distance for a purpose to be stated. The tops of the uprights 47 48 are similarly beveled from the middle in each direction and are connected on each side by similar parallel bars 51 52, bearing wedge-blocks 53 54, with their points toward the center. Beside each bar 51 52 lies a bar 55 56, respectively provided with rounded bosses 57 58. The ends of these bars 55 56 rest and slide in ways in the beveled tops of the uprights 47 48, and each pair is connected at each end with the T-head of a sliding bolt 59. The inner ends of these bolts 59 rest against a diamond-shaped head of a vertically-sliding bolt 60. The arrangement of these parts is such that by sliding the bolt 60 upward the bars 55 56 are forced outward in their ways and return when the bolts 60 descend. To raise these bolts 60, there are journaled across the uprights 47 48 short shafts 61 62, respectively, each bearing cams 63 64 to engage and raise the bolts 60. The left shaft 61 has a depending crank-arm bent at the lower end, as shown in Fig. 7, to engage and be rocked by a pin 65, projecting from the back face of the gear 40. The right shaft 62 has a like but shorter crank-arm connected and simultaneously moved with the shaft 61 by a connecting-rod 66.

Figure 8:
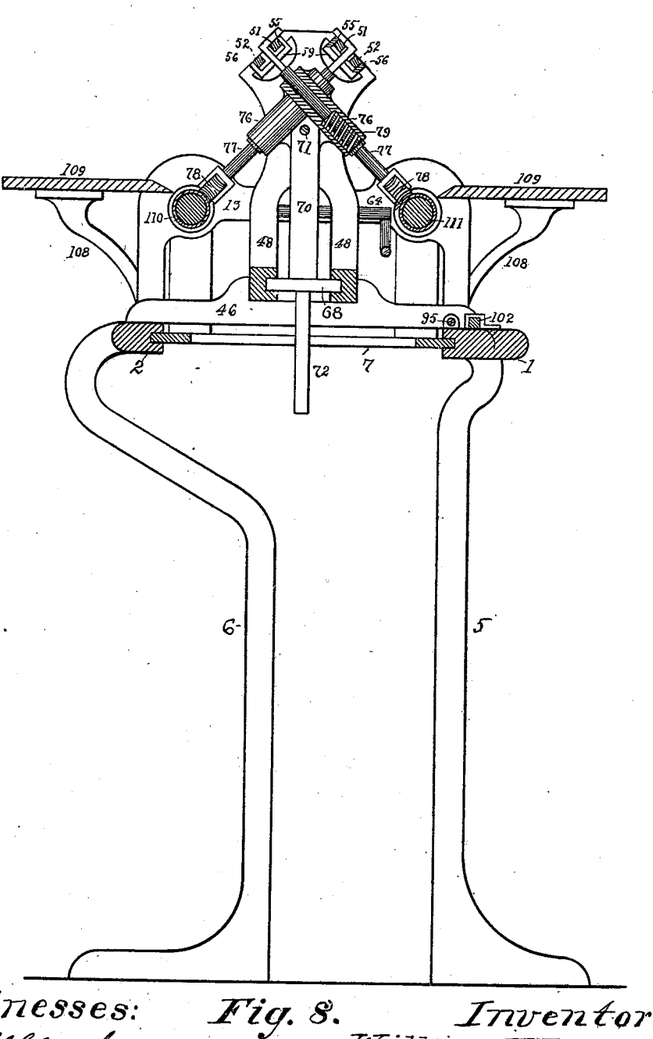
Fig. 8, a section on the same scale at the line *y y* of Fig. 1.

The roller-bearing carriage consists of two base-pieces 67 68, (shown, respectively, in Figs. 7 and 8,) fitted to slide in the ways formed by the grooves in the rails 49 50, from each of which arise posts 69 70, respectively, (also shown in Figs. 7 and 8,) united near the top by a rod 71 lengthwise of the machine. From the base-piece 67 a rigid arm 72 depends, to which is pivotally attached one end of a connecting-rod 73, the other end being journaled on a wrist-pin 74 on a wheel 75 on the shaft 37. Hence by revolving the shaft 37 the roller-bearing carriage will be moved reciprocally in its ways just described.

Secured in the top at each end of the roller-bearing carriage are two hollow cylindrical cases 76, in each of which is a sliding rod 77, that extends from the lower end and bears a grooved roller 78, and each is constantly pressed downward by a coiled spring 79. These grooved rollers are so arranged as to run on the tire-bearing mandrels when the latter are secured in the heads 26 27 28 29. The upper ends of the rods 77 also project above the cases 76, and each is reduced to pass severally between the bars 51 52 on each side of the machine and is bent to one side to form a finger to extend over and run along the surface of either to engage the wedge-blocks 53 54 and bosses 57 58 as it is turned to either side. One pair of these fingers is turned upward and the other downward, as will be noticed in Fig. 1 and also by comparing Figs. 7 and 8, the object and purpose of which arrangement is to permit the travel of each pair of rollers to overlap at the center of the course and return without interruption from these wedges. This will be understood by reference to Fig. 10, when it will be noticed that the points of the wedge-blocks 53 54 point to the right and the block 115 on the right portion of the rail 52 is to the left, a corresponding block (not shown) on the absent part of the rail 51 pointing the same way. The travel of the carriage is such that one of the fingers will run from block 54 to block 115 at each stroke, the opposite finger traveling between the block 53 and its companion block. (Not shown.)

Journaled in hangers 80 81 at the left end of the housing is a shaft 82, on one end of which is a crank-arm 83, bearing a roller 84, arranged to run on the cam-wheel 41. Near the center of the shaft 82 is a finger 85, the free end of which engages an abutment-plate 86, and as the shaft 82 is rocked forces the sliding frame 7 gradually to the right, whence it is returned as the cam-wheel revolves farther by force of the springs 19 and 21, the object and purpose of which movement is to so move the tire-bearing mandrels as to permit the rollers 78 to press the tire about the valve-stem without encountering and dislodging it, as hereinafter described.

Figures 6, 11, 12:
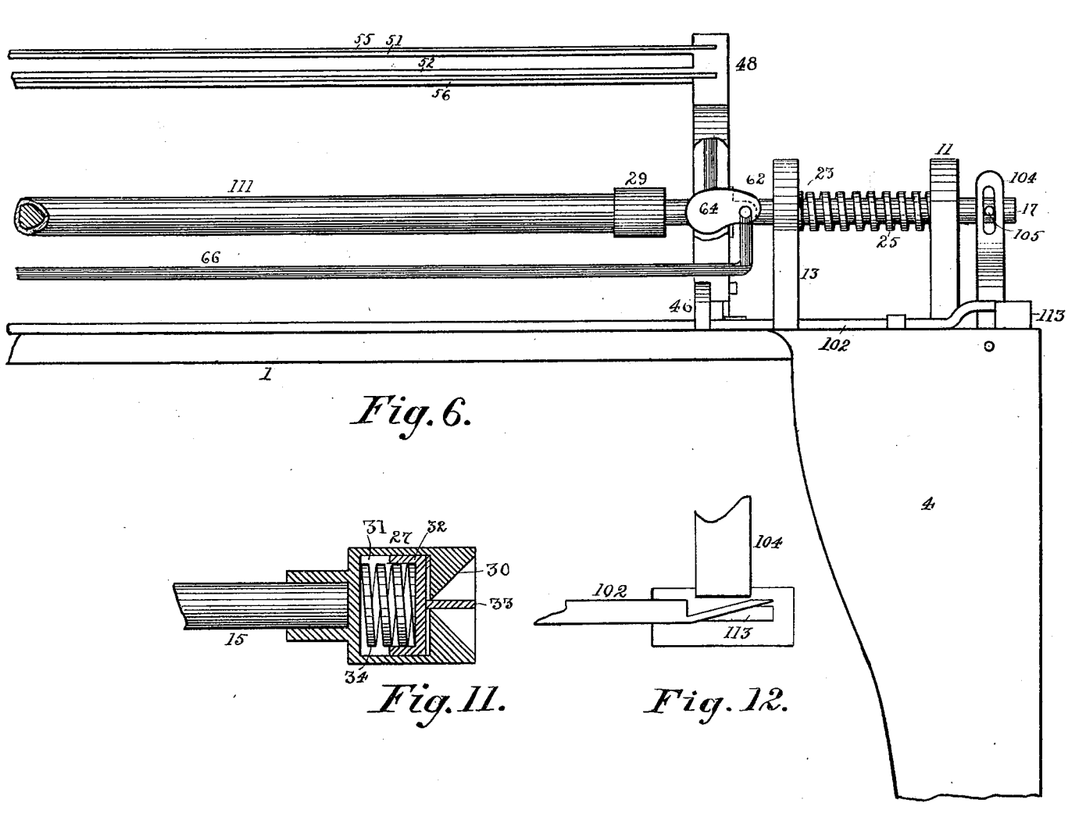

Mounted on the shaft of the gear-wheel 40, cam-wheel 41, and trip-wheel 42 is a pinion 87, that meshes in a gear-wheel 88, mounted on a wrist-pin 89, having on its face two concentric ridges 90 91, the inner slightly preceding the outer, but operating substantially at the same time. The first, 90, engages a roller on the depending end of a bar 92, arranged to move crosswise of the housing and constantly drawn inward by a spring 93. One arm of a bell-crank 94 is pivotally connected with this bar, the other arm being connected by a rod 95 with an arm of a like bell-crank 96 at the right end of the machine, which in turn is pivotally connected with bar 97, similarly arranged to slide across the housing. Pivoted in the cross-bars 45 46 and below the ends of the sliding frame 47 and 48 are pairs of rocking cams 98, with their rounded ends arranged to engage the sliding frame 47 and 48 and their lower ends pivoted to the bars 92 and 97, respectively, and so arranged that when the bars 92 97 are drawn to the front they operate to raise the roller-bearing carriage and thus draw the rollers 78 away from the tire-bearing mandrels and to release it and permit it to descend when they move inward. These parts are so adjusted as to raise the roller-bearing carriage when the tube is completed. The second ridge 91 engages a roller on the depending end of a short bar 99, similarly arranged to slide crosswise of the housing, the other end of which bar is pivoted to a bent lever 100. The opposite end of the lever 100 is connected, by means of a link 101, to one end of a sliding rod 102, constantly pressed to the left by a spring 103. The right end of the rod 102 is cut in on one side, leaving an abrupt shoulder and a reduced end bent toward the side of the shoulder and beveled at its point in line with its back edge, as shown in Fig. 12. This rod is so arranged that unless diverted it would move toward the right without encountering the rocking frame; but to cause such encounter there is located opposite said frame a wedge-shaped block 113, arranged to be engaged by the beveled end of the rod 102 and move its end back toward the frame 104, which it encounters and rocks to the right. This arrangement permits the frame 104 to rock to the left and right as the frame 7 is reciprocated in the housing until the determined time for releasing the mandrel, when it rocks the frame 104 to the right. The arms of this frame are forked to embrace the right ends of the shafts 16 17 and are slotted to receive pins 105, that are secured in said ends, and they operate to draw the shafts to the right when the rod 102 is pushed to the right by the operation of the ridge 91 and lever 100, and thus release the mandrels.

On the rails 1 and 2 of the housing are located posts 106, provided with opposite alternately-disposed rollers 107 to serve as supports for the tire-bearing mandrel at the point where the valve-stem is located and with space between them to permit the valve-stem to pass as the mandrel is revolved and to firmly press the layers of the tire together close to said stem.

On each side of the housing, supported by brackets 108, are shelves 109, on which the sheets of rubber-saturated fabric are placed preparatory to rolling and from which they are fed onto the mandrels. The inclination of the faces of the shelves 109 is such that immediately the fabric adheres to the tube on the mandrel it is drawn taut by the motion of the mandrel. Hence it winds smoothly on the mandrel, and thus prevents air from being inclosed under it.

Figure 9:
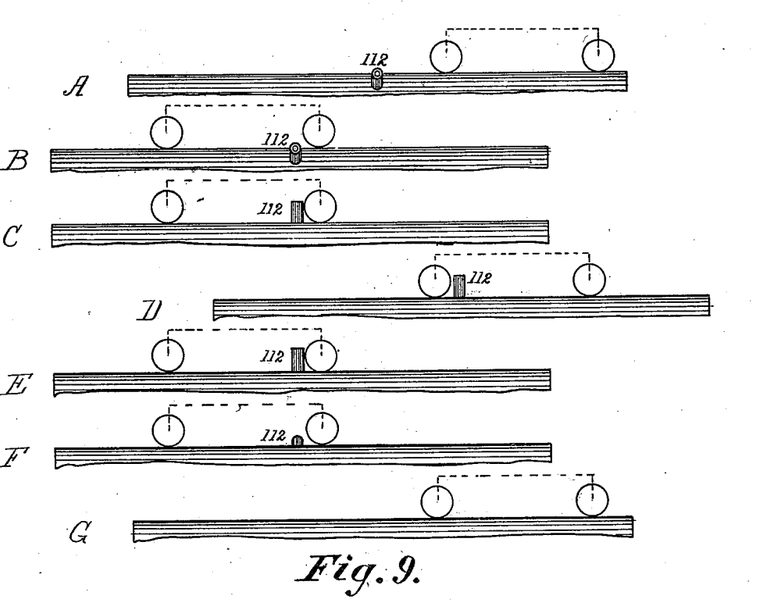
Fig. 9, a series of diagrams showing the different positions of the rollers in their operation of rolling about the valve-stem.

The construction of the machine being as described, its operation is as follows: Inner tubes being placed on the mandrels 110 111 and motion being given to the machine by the driving-pulley 38, the mandrels are placed therein by inserting their ends in the conical openings in the heads 26 28 and 27 29, respectively, by forcing heads 28 29 back far enough to permit the ends of the mandrels to enter, where they are retained by force of the springs 24 and 25. The valve-stems 112 are then placed on the tubes on the mandrels about midway between their ends, so that the opening will register with an opening in the inner tube and where they are retained by the sticky character of the rubber as prepared for vulcanization. The rubber-saturated fabric is cut in long strips or bands, square at their ends, of such width as to roll once about the mandrel and lap, and the desired number for a tire being placed to rest on the shelves 109 the edge of one strip is led forward to rest on the tube on the mandrel, when by a slight pressure by the operator it adheres and as the mandrel is progressively revolved is wound thereon, and this process is continued until the desired thickness is attained. The parts are so adjusted that immediately before the fabric commences to wind on the tube-bearing mandrel the carriage carrying the grooved rollers 78, operated by the connecting-rod 73 and moving reciprocally lengthwise of the mandrel and the roller-frame, is by means of the cams 98 permitted to descend to rest in the notches in the cross-bars 45 46, thus allowing the rollers to rest on the tube being built up on the mandrel. These rollers are each adapted to cover a segment of the mandrel, and the relation of the trip-wheel 42, pawl 44, and ratchet-wheel 20 are such that the mandrels are given a progressive partial revolution at the end of each stroke of the rollers to present a fresh segment of the tire to their action, this partial revolution being slightly less than the width of the segment covered by the rollers, so that each track slightly overlaps the one preceding. The distance between the pairs of rollers is less than their stroke, and hence the track of each pair will alternately overlap the track of the other pair. The movement of these rollers is such that both the pairs of rollers pass the center of the mandrel at each stroke—that is, both pairs of rollers move past the center of the mandrel in each direction, so as to completely and evenly press every part—and this is continued excepting in rolling the part about the valve-stem. In rolling the fabric on the mandrel the strip is so adjusted that the valve-stem will lie in the line of the lap and thus these edges lie against it. In rolling the part about the valve-stem the roller-carriage not only moves, but the mandrels are also moved lengthwise, as will now be explained by reference to the diagrams in Fig. 9. These diagrams represent the mandrel as being progressively revolved with the top moving backward and the position A as the first with the valve-stem 112 projecting upward and toward the front, but sufficiently at the side to prevent engaging the rollers, which are indicated as having just completed their movement to the right and ready to commence the return stroke to the left. During the return of the rollers to the left the sliding frame 7, supporting the mandrels, is by means of the cam-wheel 41, crank-arm 83, shaft-finger 85, receding from the abutment-plate 86, carried to the left by the springs 19 21 to the position shown in B, with the right roller close to the line of the valve-stem. At the end of each stroke the bent fingers on the upper ends of the roller-rods 77 run upon the wedge-blocks 53 54, and thus draw the rollers away from the mandrels. While the rollers are thus free from the mandrels, the latter are given a partial revolution by the pawl 44 and ratchet-wheel 20, as hereinbefore described, thereby permitting this movement without abrasion of the tire. This leaves the rollers in position C, whence they move to the right; but before completing the stroke the finger 85 has again pushed the sliding frame 7 to the right, so that at the end of the stroke they occupy the position D, with the left roller close to the valve-stem. On the return stroke the mandrel is again moved by the same mechanism to the left until at the end of the stroke the rollers occupy the position E. At the next stroke to the right the rollers pass close beside the valve-stem 112 until at the beginning of the next stroke the valve-stem is entirely out of the path of the rollers and the roller 84 on the crank-arm 83 has followed the irregular part of the cam-wheel 41 and again rests on the circular portion of the wheel. By the foregoing operation the tire has been rolled entirely about the valve-stem, thus securely embedding it in the tire. The rollers 78 then continue their former operation, rolling the remainder of the whole length of the tube on the mandrel until the starting-point is reached, when ridge 91 on the wheel 88 engages the roller on the bar 92 and by means of the mechanism heretofore described raises the roller-frame, thus lifting the rollers 78 out of contact with the tube on the mandrel. Closely following this operation the ridge 90 on the wheel 88 engages the roller on the bar 99 and draws it outward, and by means of the bent lever 100, link 101, sliding rod 102, and rocking frame 104 draws back the shafts 16 and 17, thus releasing the ends of the mandrels from the heads 26, 27, 28, and 29, upon which the blades 33 on the pistons 32 in said heads, operated by the springs 34, eject the ends of the mandrels, which are then free to be removed and others substituted.

In the foregoing operation, which is for the construction of tubes for ordinary pneumatic tires, the movable bars 55 56, bearing the bosses 57 58, perform no office and may be disconnected and removed. In constructing heavy tires for automobiles and like vehicles where nuts are embedded in the tire to hold the binding-bolts these parts are employed. In such cases the bosses 57 58 are placed on the bars 55 56 with reference to the location of the nuts in the tube on the mandrel, and hence as the roller-carriage travels along its reciprocating course the bent ends of the roller-rods 77 engage and ride over these bosses, thus raising the rollers high enough to pass without disturbing the nuts.

I have shown the apparatus adapted for the simultaneous rolling of two tubes on parallel mandrels; but it will be apparent that it may be readily adapted to the rolling of a single tire.

Having thus described my invention, what I claim, and desire to secure by Letters Patent, is—

1. In a machine for rolling tubes of the class specified, the combination with means for detachably holding a mandrel bearing an inner tube, and for revolving it with an intermittent movement, and for presenting successive layers of material to be wound thereon, of pressure-rollers arranged to travel reciprocally on said mandrel at each pause in its revolution, and mechanism coacting with the revolving machinery to cause such movement substantially as shown and described.

2. In a machine for rolling tubes of the class specified, the combination with means for detachably holding a mandrel bearing an inner tube, and for revolving it with an intermittent movement, and for presenting successive layers of material to be wound thereon, and pressure-rollers arranged to travel reciprocally on said mandrel at each pause in its revolution, and mechanism coacting with the revolving machinery to cause such movement, of device to raise said rollers from contact with the tube being formed during the time of such partial revolution, substantially as shown and described.

3. In a machine for rolling tubes of the class specified, the combination with means for detachably holding a mandrel bearing an inner tube, and for revolving it with an intermittent movement, and for presenting successive layers of material to be wound thereon, of pressure-rollers arranged to travel reciprocally on said mandrel at each pause in its revolution, and mechanism coacting with the revolving machinery to bring said rollers into contact with said material on said mandrel simultaneously with the winding of the successive layers thereon, and to place them out of contact after a determinate number of partial revolutions substantially as shown and described.

4. In a machine for rolling tubes of the class specified having means for detachably holding a mandrel bearing an inner tube, and revolving it with an intermittent movement, a reciprocating roller-carriage having sliding shafts bearing spring-pressed rollers arranged to run reciprocally on said mandrel, and fingers extending from said roller-shafts in combination with wedges to be engaged thereby at the end of each movement of said carriage, to raise said rollers from the mandrel, substantially as shown and described.

5. In a machine for rolling tubes of the class specified, the combination with pressure-rollers arranged to travel reciprocally along a mandrel to hold the tube, of oppositely-disposed spring-pressed heads to receive the ends of said mandrel, and mechanism to cause intermittent revolution of one of said heads to revolve said mandrel, substantially as shown and described.

6. In a machine for rolling tubes of the class specified, the combination with pressure-rollers arranged to travel reciprocally along a mandrel to hold the tube, of oppositely-disposed sliding spring-pressed heads to receive the ends of the mandrel, mechanism to cause intermittent revolution of one of said heads to revolve said mandrel, and coacting mechanism to withdraw one of said heads after a determinate number of revolutions of said mandrel to permit its removal substantially as shown and described.

7. In a machine for rolling tubes of the class specified, the combination with pressure-rollers arranged to travel reciprocally along the mandrel to hold the tube, of oppositely-disposed spring-pressed heads to receive the ends of the mandrel, mechanism to cause intermittent revolution of one of said heads to revolve the mandrel, coacting mechanism to withdraw one of said heads after a determinate number of revolutions of said mandrel, and a spring-pressed blade in the opposite head to eject the end of the mandrel therefrom, substantially as shown and described.

8. In a machine for rolling tubes of the class specified, the combination with pressure-rollers arranged to travel reciprocally along a mandrel to hold the tube, of a sliding frame arranged to move reciprocally in a course parallel with the course of said rollers, having spring-pressed heads to receive the ends of said mandrel, mechanism to operate said rollers, coacting mechanism to cause intermittent revolution of said mandrel, and devices to move said frame reciprocally during a portion of the revolution of said mandrel to prevent the rollers from engaging the valve-stem, substantially as shown and described.

9. In a machine for rolling tubes of the class specified adapted to embed screw-threaded nuts therein, having means for detachably holding a mandrel bearing an inner tube and for revolving it with an intermittent movement a reciprocating roller-carriage having sliding spring-pressed rollers arranged to run reciprocally on said mandrel and fingers extending from said roller-shafts, in combination with a series of bosses arranged in the same order and distance apart as said screw-threaded nuts, adapted to be engaged by said fingers to raise said rollers to pass said nuts, substantially as shown and described.

10. In a machine for rolling tubes of the class specified, the combination with means for detachably holding a mandrel bearing an inner tube and for revolving it with an intermittent movement, and for presenting successive layers of material to be wound thereon, and pressure-rollers arranged to travel reciprocally on said mandrel at each pause in its revolution, and coacting machinery to cause such movement, of fixed rollers adjusted to bear against said mandrel and to press the tubes thereon adjacent to the valve-stem, substantially as shown and described.

In testimony that I claim the above I hereunto set my hand in the presence of two subscribing witnesses.

WILLIAM H. TANEYHILL.

In presence of—
C. P. HUMPHREY,
C. E. HUMPHREY.